(No Model.) 2 Sheets—Sheet 1.
E. THOMSON.
METHOD OF AND MEANS FOR COMPOUNDING DYNAMO ELECTRIC MACHINES.
No. 511,375. Patented Dec. 26, 1893.
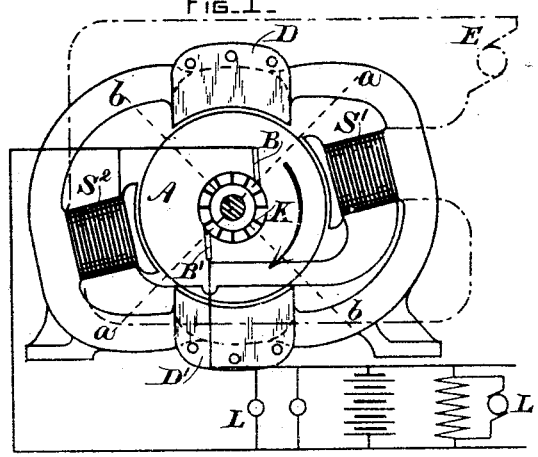
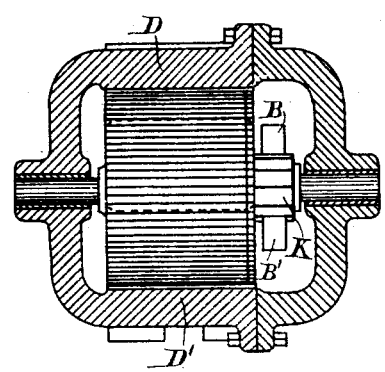
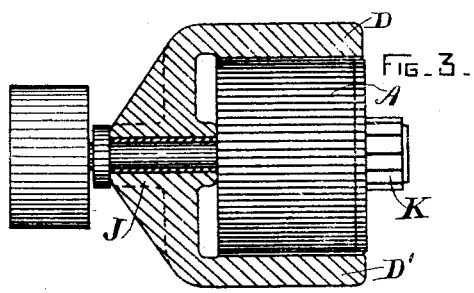
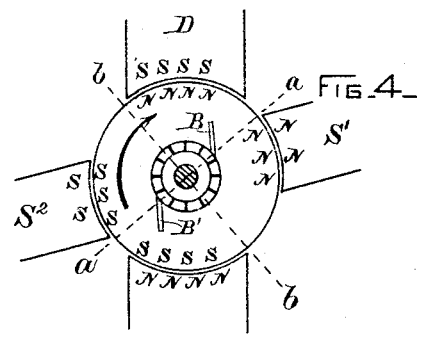
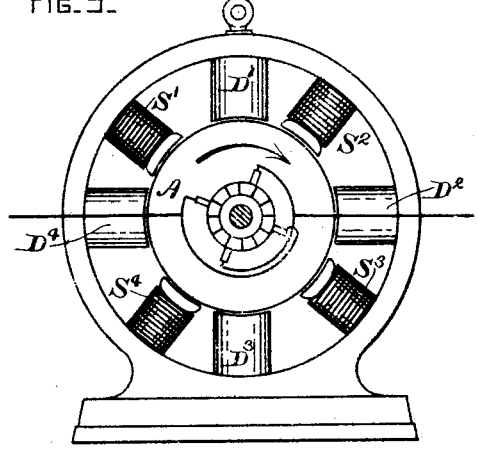
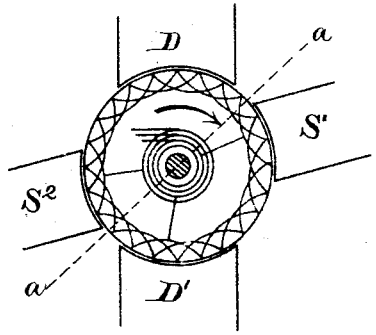
WITNESSES — INVENTOR —

(No Model.) 2 Sheets—Sheet 2.
E. THOMSON.
METHOD OF AND MEANS FOR COMPOUNDING DYNAMO ELECTRIC MACHINES.
No. 511,375. Patented Dec. 26, 1893.
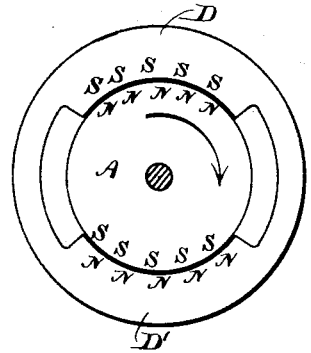
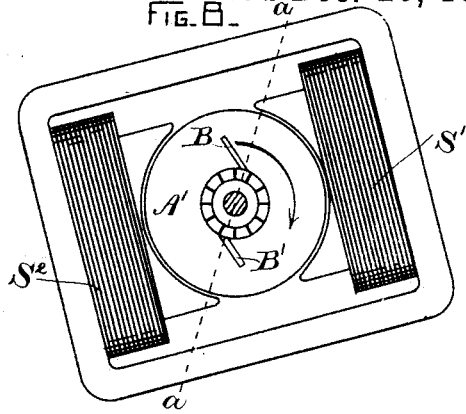
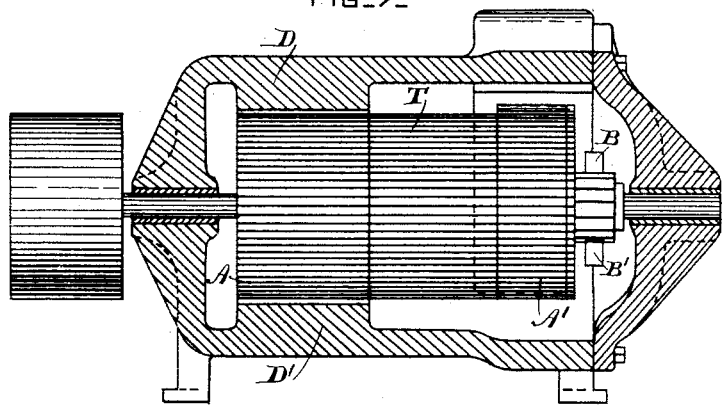
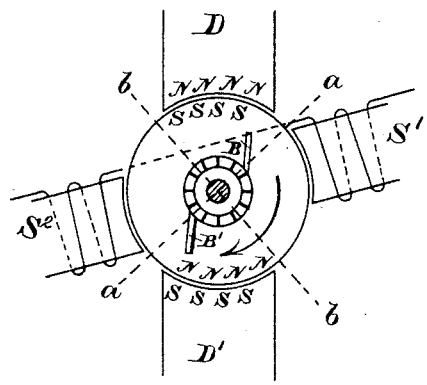
WITNESSES
Alec F. Macdonald
[signature]
INVENTOR
Elihu Thomson,
By Bentley & Blodgett,
Attys.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

METHOD OF AND MEANS FOR COMPOUNDING DYNAMO-ELECTRIC MACHINES.

SPECIFICATION forming part of Letters Patent No. 511,375, dated December 26, 1893.

Application filed November 23, 1892. Serial No. 452,911. (No model.)

*To all whom it may concern:*

Be it known that I, ELIHU THOMSON, a citizen of the United States, residing at Swampscott, county of Essex, State of Massachusetts, have invented a certain new and useful Improvement in Methods of and Means for Compounding Dynamo-Electric Machines, of which the following is a specification.

The present invention relates to methods of and means for compounding a dynamo electric machine or generator of electricity so as to maintain a potential which is fairly constant under load, or to obtain an increased potential in passing from light to full load, or in general, to increase the effect of the field magnetism of such a machine as the load comes on.

My invention dispenses with the ordinary series winding, such as is present in compound-wound dynamos, although the principles of my invention might be used in conjunction with such compound winding.

I am able, by my invention, to construct a machine the excitation of the field of which may be maintained either by a shunt to the mains, or by a separate excitation fairly constant in character, while the voltage of the machine is maintained, as the load comes on, automatically, without having recourse to the passage of current through a series winding affecting the field, and therefore without incurring the inconveniences which may arise in the use of such compound machines when used to charge storage batteries, or accumulators, from possible reversals of current and reversals of the effect of the series field. I am also enabled to run such dynamo electric machines in multiple without the use of equalizers, or equalizing connections, such as are commonly employed with compound-wound machines. By so constructing dynamo electric machines I have been able to maintain the full potential of the machine during a variation of work from no load to full load, the field magnets having no series winding whatever.

In my invention I may use any form of armature suitable for rotation in the field, and the generation of currents in the winding, and therefore in describing my invention I will assume that a good type of armature has been employed and will not, therefore, describe the winding. It may be remarked, however, that the armature may be wound with the Gramme winding or have a drum winding, with any of the various modifications thereof. It may be made with or without projections, though I prefer an armature having projections and the winding set in between the projections. The body of the armature should have plenty of laminated iron.

The principle of my invention is to make the current which flows in the armature winding, under load, so act as to produce a field of force in which the armature winding moves, and which field will be in proportion to the load on the armature, and therefore increases the electromotive force, or counteracts any decrease of electromotive force which might be suffered under load. This, briefly stated, is accomplished in my method, by placing opposite those parts of the armature which become polarized by the currents flowing therein, iron masses or what might be called dead poles, which only become active when the armature is under load.

In the accompanying drawings Figure 1 is a typified dynamo containing the essential features of my invention. Figs. 2 and 3 show modifications in the construction Fig. 1. Fig. 4 is a diagram illustrative of the actions involved. Fig. 5 is a figure showing the application of my invention to a multipolar dynamo. Fig. 6 is a further diagram showing the application of my invention to other forms of apparatus. Figs. 7, 8, and 9 are drawings showing a modified embodiment, and Fig. 10 is a further diagram illustrative of the actions.

In Fig. 1 let A represent any good form of armature suitable for revolution opposite field poles, and provided with a commutator K in the ordinary way. Let it be revolved in the direction shown by the arrow, and the brushes B, B' applied just in front of the field poles wound with coils $S^2$, $S'$. The connections from the brushes are carried out and the load, as of lights, batteries, or motors, L, L, fed therefrom. The coils $S^2$, $S'$ are made of comparatively fine wire and are put in shunt to the brushes of the machine, by connections, as shown, which constitute a shunt winding. As an alternative construction, the coils may be put in circuit with a separate source of current from the exciter E as indicated by a dotted circuit in the figure. The excitation provided by the coils S², S' acting on their appropriate poles presented to the armature A should be such that the machine gives its normal potential, and the poles acted on by the coils S², S' may be carried up to a high state of magnetization if desired, or the coils S², S' may be given a very high magnetic force, as there is no need of limiting the magnetization for the sake of obtaining a further strengthening of the poles during working. In addition to the wound poles S², S' I provide a pair of poles D, D', which I may term dead poles under light load, as they are not magnetized by any winding applied to them, and when the armature is not developing current these masses D, D', which are connected magnetically exterior to the armature, remain unmagnetized, but when the armature is under load they become active magnetic poles, because they are presented to the armature in the area included between the dotted lines $a, a$ and $b, b$.

The dotted line $a, a$ represents the diameter of commutation where the brushes are applied, and the dotted line $b, b$ represents the diameter of neutrality, or the diameter at which brushes placed one on each side would give no difference of potential.

The dotted line $b, b$ represents, in fact, a line showing the neutral magnetic points of the armature core considered as a magnet, and it will be seen that the poles D, D' are applied in the quadrant between the lines $a, a$ and $b, b$.

If the machine be properly proportioned an effect of more or less perfect compounding is obtained; that is to say, properties are conferred upon the machine similar to those which are obtained by winding the field magnets with coils of a series winding, in addition to the shunt winding, or separately excited winding, and as this result is accomplished without resorting to series winding there is no danger of reversal in charging accumulators, and there is no need of equalizing connections when such machines are run in multiple. The machines to be run in multiple should preferably not be so proportioned as to obtain an effect of over-compounding by the practice of my invention.

Instead of connecting the magnetic masses D, D' as shown in Fig. 1 they may be separated altogether from the magnetic structure bearing the coils S², S', and they may be connected around the armature, as shown in Fig. 2, and may, in fact, form the means for supporting the bearings of the armature, as there indicated in section, or, as in Fig. 3, the magnetic masses or poles D, D', may be connected at one end only to a single bearing to be used as at J. All that is required is that these magnetic masses D, D' shall be sufficient in section, and be so intimately connected with the magnetic resistance of the circuit through them from the armature, as will give the described effect, and for this reason I prefer an armature with teeth or projection, or what is now sometimes called an "iron-clad" armature, running close to the parts D, D'.

To exemplify the actions in my invention reference is had to Fig. 4. Assuming the armature to be stationary and that current is applied through the armature winding by the brushes placed on the line $a, a$, polarities would be induced in the armature structure, as indicated by the letters near its periphery, or, in other words, the armature would become a magnet and tend to complete a magnetic circuit external to itself, and the neutral line of the magnet would be through $b, b$. In the operation of such a generator structure the pole S' would be magnetized by a coil placed thereon, as a north pole N, N, and the pole S² would be magnetized as a south pole S, S; but with the current passing in the armature, as assumed at first, or with the current which is now generated in the armature by its revolution, there will be induced by the armature magnetism after the armature is placed under load, poles in D of south name or of south polarity, and polarity in D' of north character. It will therefore be seen that on one side the line $a, a$, or diameter of commutation, the field will be all north due to S' and D', and on the other side the field will be all south, due to S² and D. The wire of the armature therefore will be cutting magnetic lines in one direction on each side of the line $a, a$, and in the other direction on the other side of the line $a, a$, which is the condition for best work as a generator. Assume, now, that the armature current is cut off, or ceases, as from failure to have a load, or owing to translating devices, or other energy using or storing devices, being cut off from the circuit, then the polarities of the armature fail to manifest themselves in so far as they are induced under the poles S', S², which still remain active, and the poles D, D' become dead poles, and the lines of magnetism which the armature had imparted to the circuit through these poles will be withdrawn. The armature will then be working in a weaker field, and thus the potential instead of increasing may be made to remain constant, or be the same as when the armature was under full load, even though the armature is without load. The compounding effect, then, in my invention is obtained by the armature as a magnet acting to produce by induction a supplementary field instead of by an external series winding. The armature is thus revolved in a compound field composed of a normal field and a supplementary field produced by induction from the armature.

In applying my invention to a multipolar form of machine it is only necessary to repeat the sequence of excited poles and dead poles, to use the term, around the armature in the proper manner. Thus in Fig. 5 a four-pole structure is shown. As an illustration the opposite brushes are connected and there are four brushes. There are four poles excited either in shunt or by a separate excitation, S', S², S³, S⁴, and four of the armature magnetized poles D', D², D³, D⁴, alternating with the others, and placed in proper relative position, as represented in Figs. 1 or 4. The number of poles of course will depend upon the construction of the apparatus, and the arrangement may be extended to cover a multipolar machine with many poles.

Fig. 6 is intended to show that the armature structure may be without a commutator provided that the currents passing in it are such as will produce a definite polarity in a definite direction, as $a$, $a$, which is the case when a commutator is used. The invention might therefore become applicable to dynamos developing alternating currents in suitable windings.

A further modification of the invention is shown in Figs. 7, 8, and 9. In this case there are substantially two armatures or revolving bodies of magnetizable laminated iron, as A, A', one of which, A, revolves between iron masses connected, as D, D', and the other revolves between poles wound with coils S², S', forming practically a separate field magnet system. The windings over the two armature bodies A, A' are made substantially one, that is the conductors are carried over both armature bodies, as plainly exhibited in Fig. 9, and form substantially the same winding, the commutator connections being arranged in the ordinary way with brushes B, B' to take off the current, as shown in Figs. 8 and 9. In this case the polar portions D, D' and the poles affected by the exciting winding S, S' will be angularly displaced about in the relation shown in Figs. 7 and 8 if superposed or, if the gaps between the poles were to be placed in corresponding relation, there would be a twist in the windings occurring between the armature bodies at the position marked T in Fig. 9, the amount of the twist being such as to throw the induction in the two sections of the winding A, A' into proper relation to give the effect of the angular displacement of one set of poles with respect to the other, as exhibited in Figs. 7 and 8, which represent their relative positions when the windings are straight. In this construction there is no polarity developed in the magnetic circuit of D, D' until the armature is under load, when, as before, the armature itself, by acquiring polarities, as indicated in Fig. 7, induces opposite polarities in the field poles D, D', which have the effect of compounding or causing the armature section A to become a generator in addition to the section A', when under load. It will be well understood that if the current through the armature be reversed from that which passes when the machine is a generator, the opposite polarities will be induced in the poles D, D', as in Fig. 10, to what would exist when the armature is used as a generator. The machine would become a motor in the latter case, and the effect would be to weaken the generator field strength under load and tend to maintain the speed of the motor under work. My invention relates more particularly, however, to generators, as the difficulties of commutation of a motor are increased when run in the way last described.

What I claim as new, and desire to secure by Letters Patent, is—

1. The method of sustaining or increasing the electro-motive force of a dynamo electric machine, which consists in magnetizing pole pieces adjacent to the polarized part of an armature by induction from the armature itself.

2. The method of sustaining or increasing the electro-motive force of a dynamo electric machine, which consists in inducing polarity in pole pieces adjacent to the polarized part of an armature by means of the current flowing in the conductors upon the armature itself.

3. The method of sustaining or increasing the electro-motive force of a dynamo electric machine, which consists in causing currents in the conductors upon an armature to induce in an unwound field magnet a field of force in which the armature moves.

4. The method of automatically sustaining or increasing the electro-motive-force of a dynamo electric machine, which consists in rotating the armature in a compound field composed of a normal field and a supplementary field produced by induction from the armature so as to vary in correspondence with the current therein.

5. The method of sustaining or increasing potential of the generated current of a dynamo-electric machine during an increase of load, which consists in dividing the magnet poles, magnetizing one pole of each division to approximately full strength and inductively magnetizing the other pole by the armature magnetism in correspondence to the increase of load.

6. The method of sustaining or increasing the potential of a dynamo-electric machine in correspondence to an increase of load, which consists in placing masses of iron having no conductor thereon adjacent to those parts of the armature lying between the diameter of commutation and the diameter of neutrality.

7. A dynamo electric machine having masses of iron with no conductor thereon adjacent to those parts of the armature lying between the diameter of commutation and the diameter of neutrality.

8. A dynamo electric machine having near each of its field magnet poles a "dead pole," substantially as described.

9. A dynamo electric machine having near each of its field magnet poles and adjacent to the armature, a "dead pole," arranged on the same side of the diameter of neutrality of the armature as the field magnet pole to which it is adjacent, substantially as set forth.

10. A dynamo electric machine having a shunt wound field magnet, and two "dead poles" magnetically connected and arranged between the diameter of commutation and the diameter of neutrality of the armature, substantially as set forth.

11. A dynamo electric machine having "dead poles" alternating with its field magnet poles, all of said poles being magnetically connected, substantially as described.

12. A dynamo electric machine having two or more sets of poles co-acting to develop electromotive force in the armature winding, one pole of each set being energized by the current in a circuit extended from the armature winding, and the other pole of each set being inductively magnetized by the armature.

13. A dynamo electric machine having its field-magnet poles of each polarity divided, one division of such pole being energized to full magnetization, and the other division arranged adjacent to the polarized portion of the armature; whereby on an increase of load the second division is strengthened by magnetic induction from the armature in correspondence with the increase of load, thus acting to sustain or increase the electromotive force of the generated current.

In witness whereof I have hereto set my hand this 19th day of November, 1892.

ELIHU THOMSON.

Witnesses:
   JOHN W. GIBBONEY,
   BENJAMIN B. HULL.